United States Patent
Yeh (10) Patent No.: US 7,656,688 B2
(45) Date of Patent: Feb. 2, 2010

(54) DC-DC CONVERTER FOR A DISPLAY

(75) Inventor: Shin-Hung Yeh, Taipei (TW)

(73) Assignee: AU Optronics Corp., Hsinchu (TW)

( * ) Notice: Subject to any disclaimer, the term of this patent is extended or adjusted under 35 U.S.C. 154(b) by 309 days.

(21) Appl. No.: 11/168,798

(22) Filed: Jun. 28, 2005

(65) Prior Publication Data

US 2006/0114701 A1 Jun. 1, 2006

(30) Foreign Application Priority Data

Nov. 29, 2004 (TW) .............................. 93136716 A (51) Int. Cl.
*H02M 3/07* (2006.01)
(52) U.S. Cl. ........................................ 363/60; 327/536
(58) Field of Classification Search ................. 327/536, 327/537; 363/59, 60, 63; 307/110; 257/299; 345/52
See application file for complete search history.

(56) References Cited

U.S. PATENT DOCUMENTS

| 5,461,557 | A | * | 10/1995 | Tamagawa | .................... 363/60 |
| 5,521,547 | A | * | 5/1996 | Tsukada | ...................... 327/537 |
| 5,920,225 | A | * | 7/1999 | Choi et al. | ................... 327/536 |
| 6,097,665 | A | * | 8/2000 | Tomishima et al. | ..... 365/230.06 |
| 6,507,237 | B2 | * | 1/2003 | Hsu et al. | .................... 327/538 |
| 6,741,230 | B2 | * | 5/2004 | Sakai et al. | .................... 345/99 |
| 2001/0030571 | A1 | * | 10/2001 | Tsutsui et al. | ................ 327/536 |

* cited by examiner

*Primary Examiner*—Harry Behm
(74) *Attorney, Agent, or Firm*—Thomas, Kayden, Horstemeyer & Risley (57) ABSTRACT

A DC-DC converter for a display. The DC-DC converter comprises a negative voltage generator, a level sifter and a DC-DC sub-converter. The negative generator generates a negative voltage. The level shifter, coupled to the negative voltage generator, generates complementary switch control signals. The DC-DC sub-converter coupled to the level shifter operates in response to the complementary switch control signals.

16 Claims, 10 Drawing Sheets

DC-DC CONVERTER FOR A DISPLAY

BACKGROUND

The invention relates to a DC-DC converter and, in particular, to a DC-DC converter for a display panel.

Due to high carrier mobility, low temperature poly-silicon (LTPS) technology makes it possible to integrate peripheral circuits on a glass substrate. With this technology, some integrated circuit (IC) functions can be implemented with circuits of thin film transistors fabricated on the glass substrate.

Integration of DC-DC converters on glass substrate simplifies implementation and reduces costs of integrated circuits. However, clock skew often occurs during clock pulses because of loading effect on the panel. This phenomenon causes charge-sharing problems, leading to performance degradation.

Figure 1:
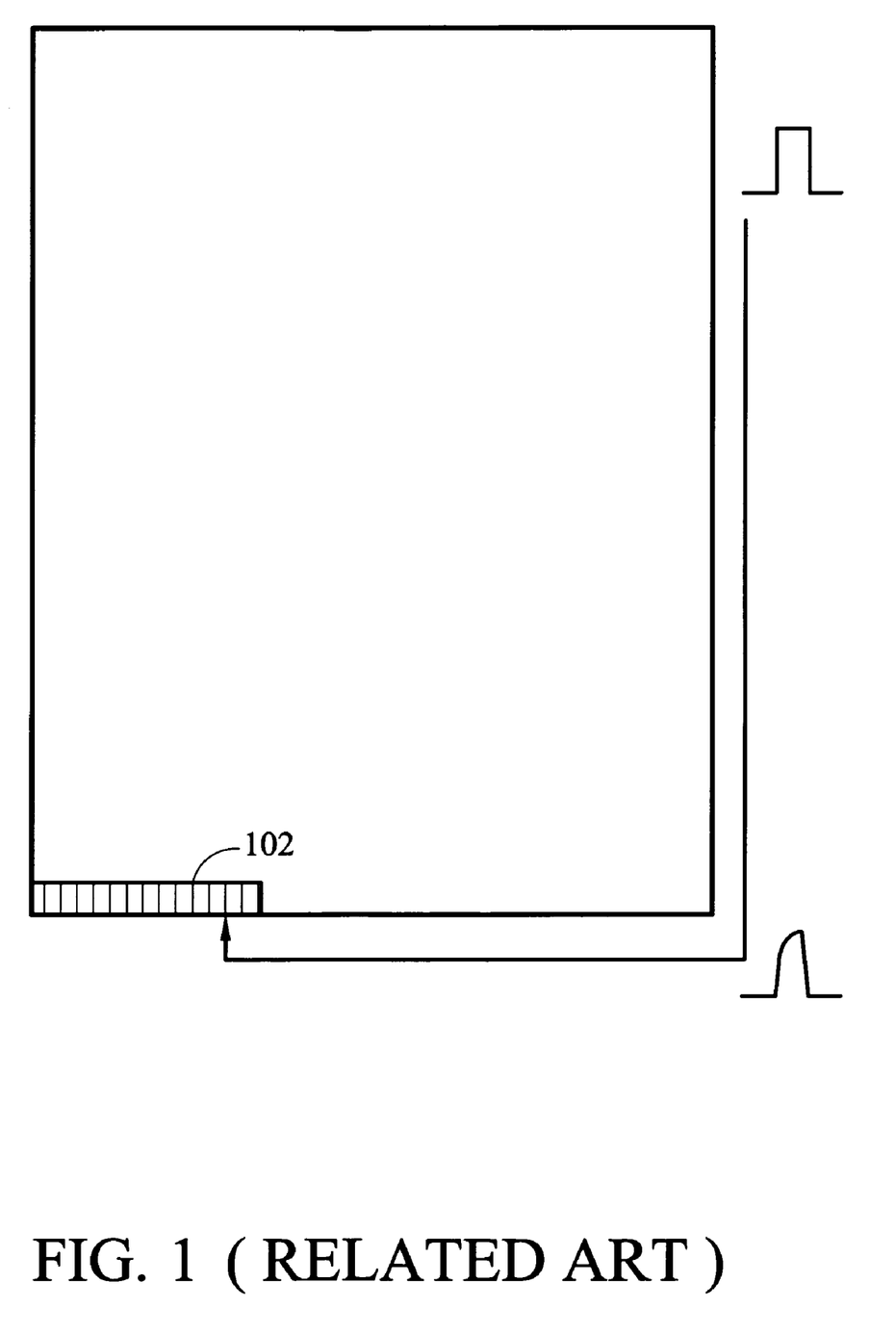
FIG. 1 is a schematic diagram of a conventional DC-DC converter in a display panel.

FIG. 1 is a schematic diagram of a conventional DC-DC converter in a display panel. In this architecture, the DC-DC converter 102 is far from a clock signal generator and thus the loading effect of the panel distorts the clock signal.

Figure 2:
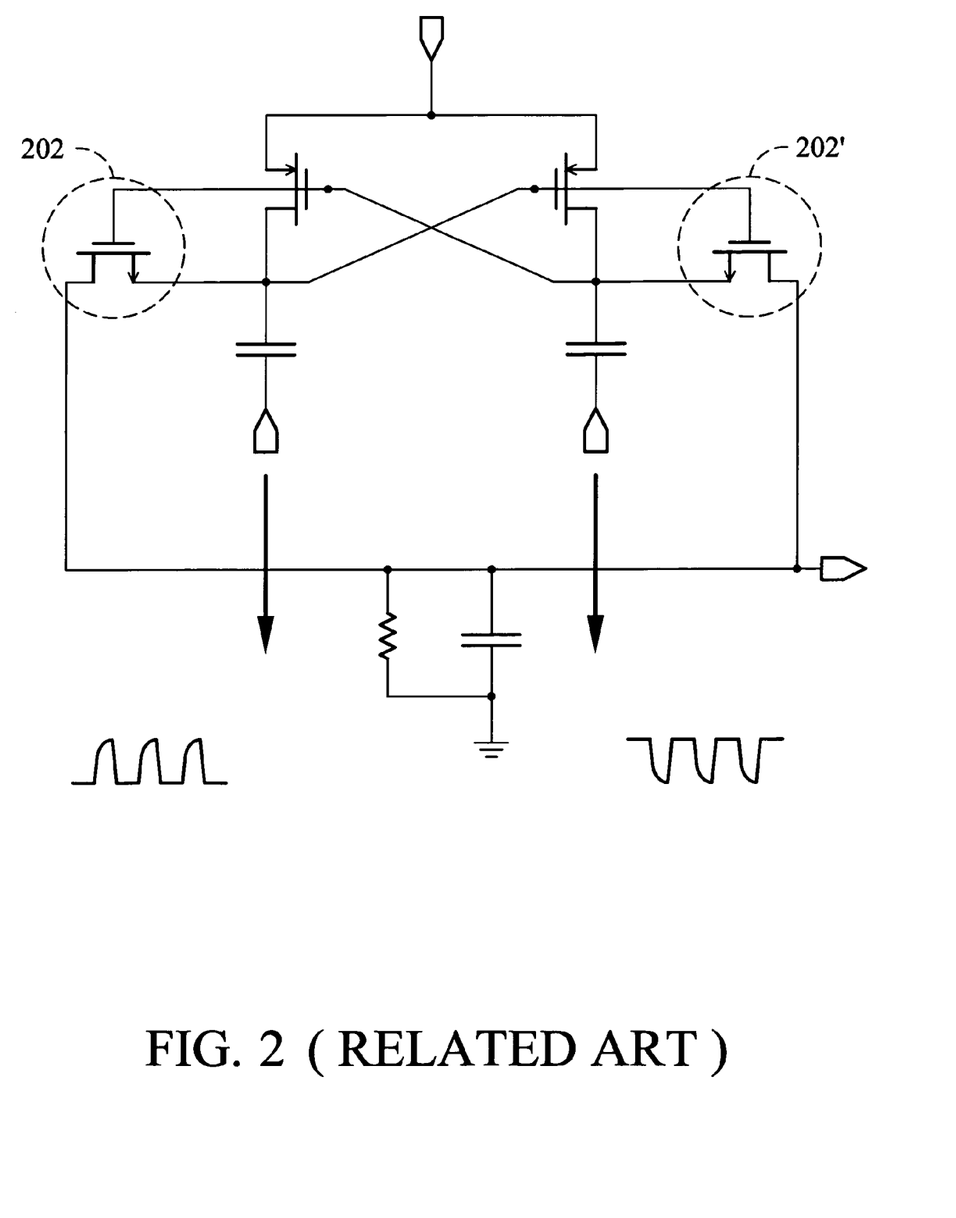
FIG. 2 is a circuit diagram of a conventional DC-DC converter.

FIG. 2 is a circuit diagram of a conventional DC-DC converter. In this structure, the clock signal is distorted by the loading effect. Switch transistors 202, 202' cannot be fully turned on or off in time, resulting in charge-sharing problems. The output voltage of the DC-DC converter is also affected.

Figure 3:
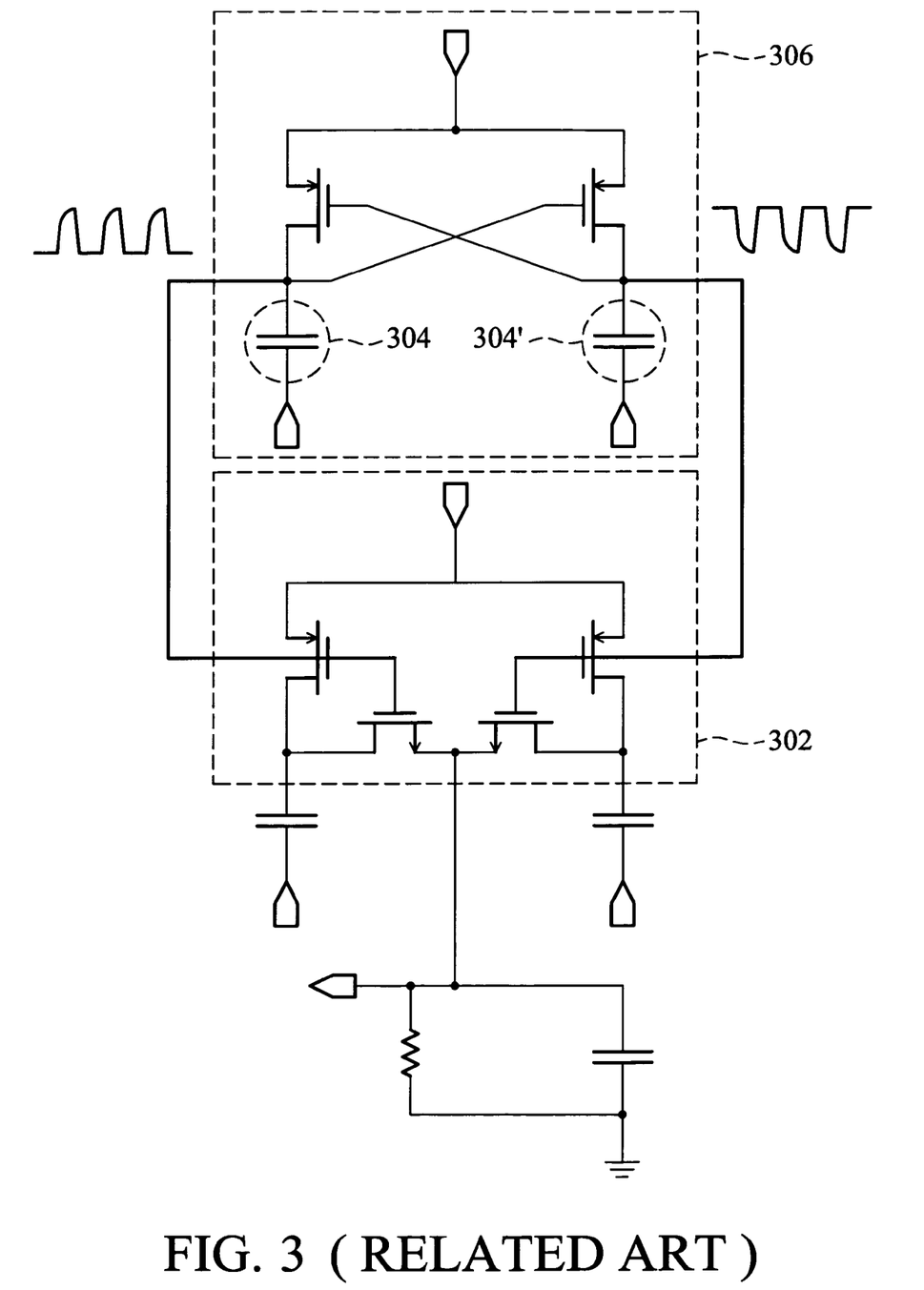
FIG. 3 is a circuit diagram of another conventional DC-DC converter.

FIG. 3 is a circuit diagram of another conventional DC-DC converter. The DC-DC converter is divided into a switch control and a charge pumping part. A coupling pair 306 generates control signals for control of the switch transistor 302. However, the skewed clock signal is transmitted to the switch transistor 302 through the coupling capacitors 304, 304'. Since clock skew of the input clock signal still exists, the charge-sharing problem affects the efficiency of the charge pump in the DC-DC converter.

SUMMARY

It is an object of the present invention to provide a DC-DC converter. Rising time and falling time of clock signals are reduced and charge-sharing problems are eliminated.

An embodiment of a DC-DC converter comprises a negative voltage generator, a level shifter, and a DC-DC sub-converter. The level shifter is coupled to the negative voltage generator and receives negative voltage therefrom to generate a pair of complementary switch control signals. The DC-DC sub-converter is coupled to the level shifter. The DC-DC sub-converter comprises a set of switch transistors, controlled by the complementary switch control signals.

The DC-DC converter according to the embodiment of the invention comprises a built-in level shifter and a negative voltage generator. The negative voltage generator provides a negative voltage to the level shifter. A pumping signal of the DC-DC sub-converter is rectified through the built-in level shifter such that leakage currents of the switch transistors are minimized. In addition, clock control signals with a larger voltage swing can fully turn off the switch transistor. As a result, the output voltage of the DC-DC converter is improved.

DETAILED DESCRIPTION

Figure 4:
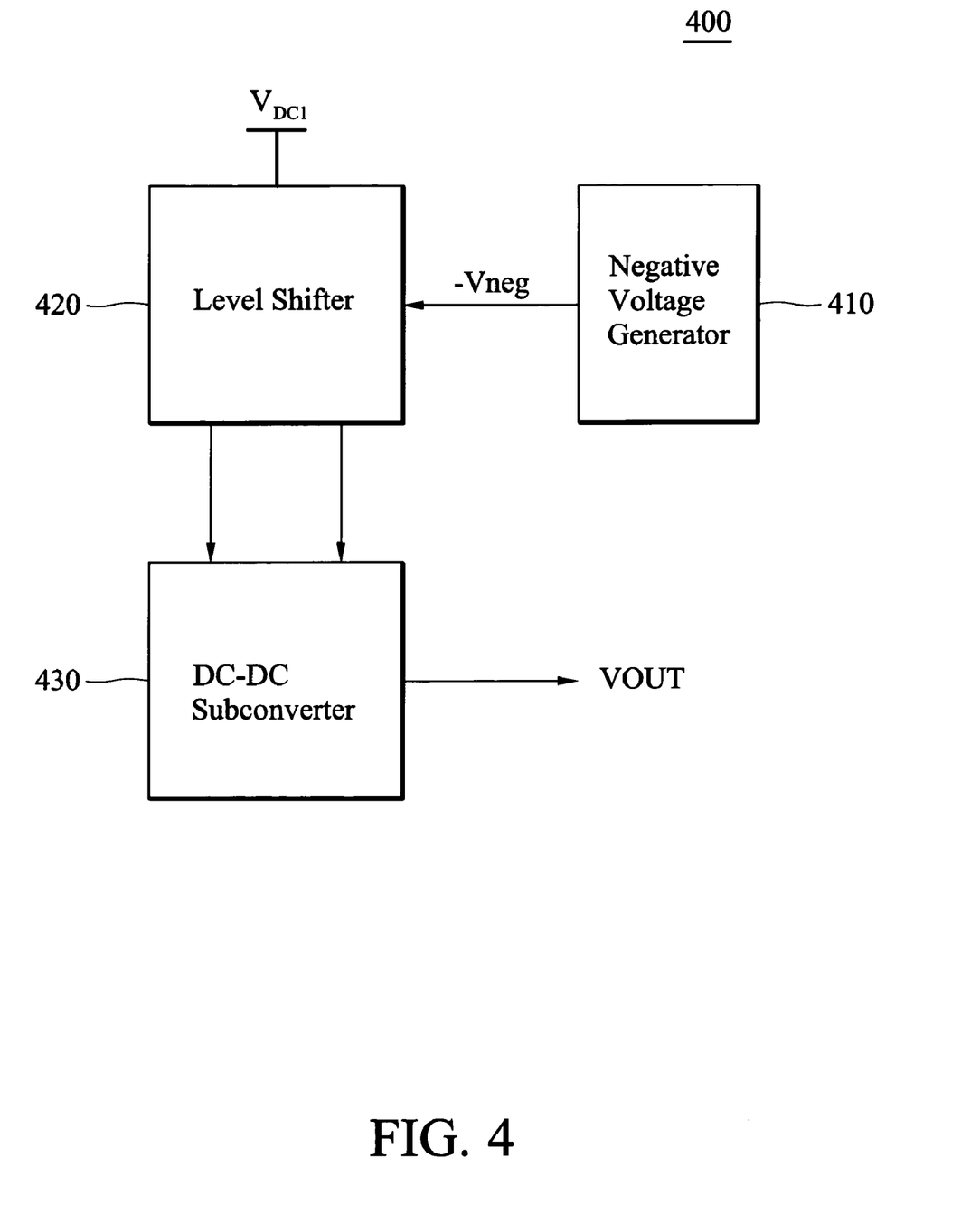
FIG. 4 shows a block circuit diagram of a DC-DC converter according to an embodiment of the invention.

FIG. 4 shows a DC-DC converter 400 according to an embodiment of the invention. The DC-DC converter 400, formed on a glass substrate, comprises a negative voltage generator 410, a level shifter 420, and a DC-DC sub-converter 430. The negative voltage generator 410 generates a negative voltage −Vneg. The level shifter 420 is coupled to the negative voltage generator 410 and generates a pair of complementary switch control signals SW and XSW. Voltages of the complementary switch control signals SW and XSW range from the negative voltage −Vneg to a DC supply voltage $V_{DC1}$. −Vneg is the negative voltage generated by the negative voltage generator 410. Due to the level shifter 420, the voltage swing of the complementary switch control signals SW and XSW is increased from $V_{DC1}$ to $V_{DC1}$+Vneg. The DC-DC sub-converter 430 is coupled to the level shifter 420 and controlled by complementary switch control signals SW and XSW.

Figure 5:
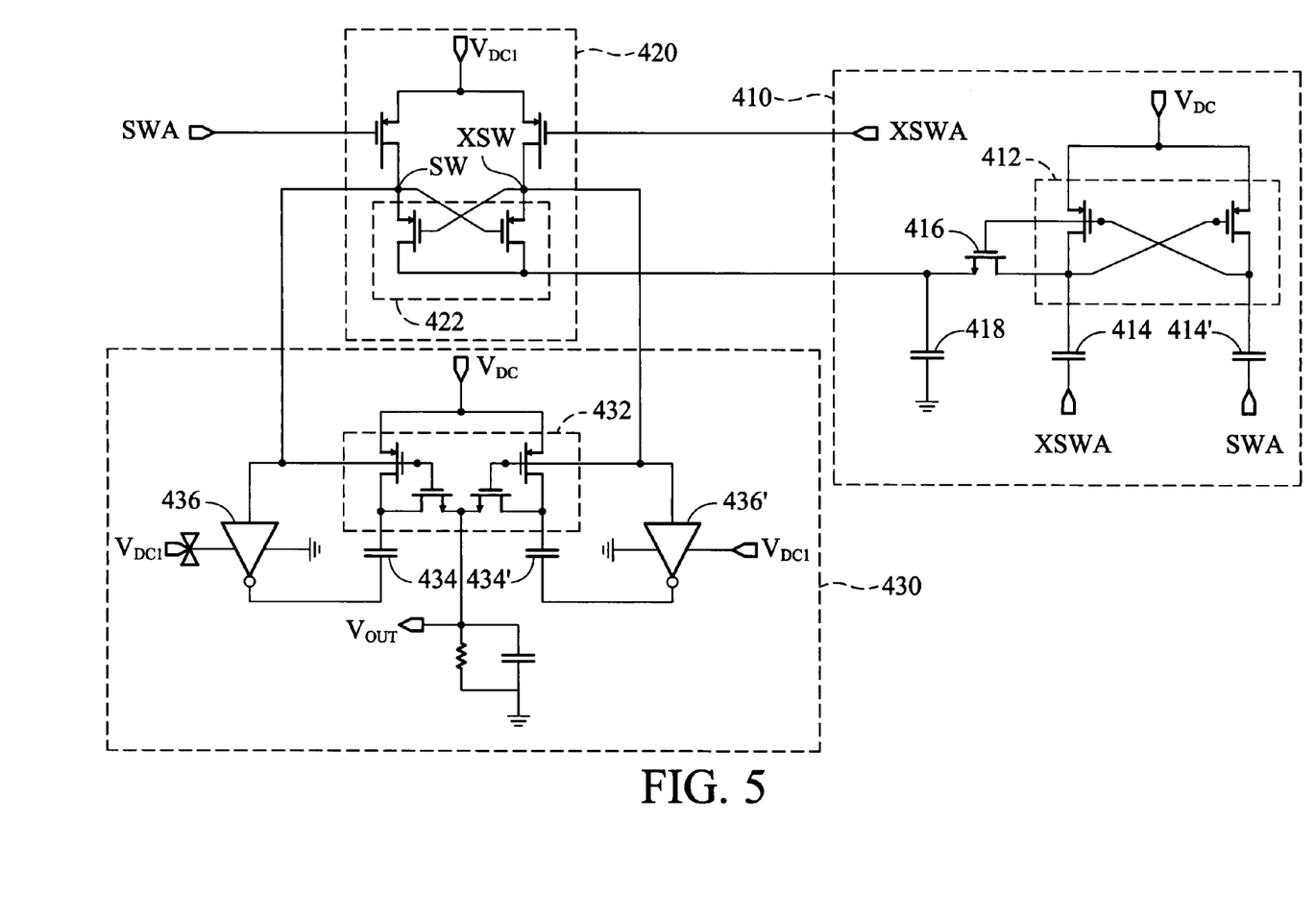
FIG. 5 is a detailed circuit diagram of the DC-DC converter shown in FIG. 4.

FIG. 5 is a detailed circuit diagram of the DC-DC converter shown in FIG. 4. The DC-DC sub-converter 430 has a charge pump structure. The DC-DC sub-converter 430 comprises a set of thin film switch transistors 432 and coupling capacitors 434, 434' coupled to the thin film switch transistors 432. Furthermore, the DC-DC sub-converter 430 may comprise a pair of inverters 436 and 436' coupled to the coupling capacitors 434, 434', respectively and controlled by the complementary switch control signals SW and XSW. Preferably, the inverters 436, 436' are respectively coupled to a DC supply voltage $V_{DC1}$. Inverters 436 and 436' perform similar to a buffer. Waveforms of the complementary switch control signals SW and XSW are refined such that rising and falling times are reduced significantly and charge-sharing problems are avoided. In addition, the negative voltage generator 410 can have a charge pump structure comprising a pair of cross-coupled transistors 412 and coupling capacitors 414, 414'. Moreover, the level shifter 420 comprises a pair of cross-coupled transistors 422.

Figure 6A:
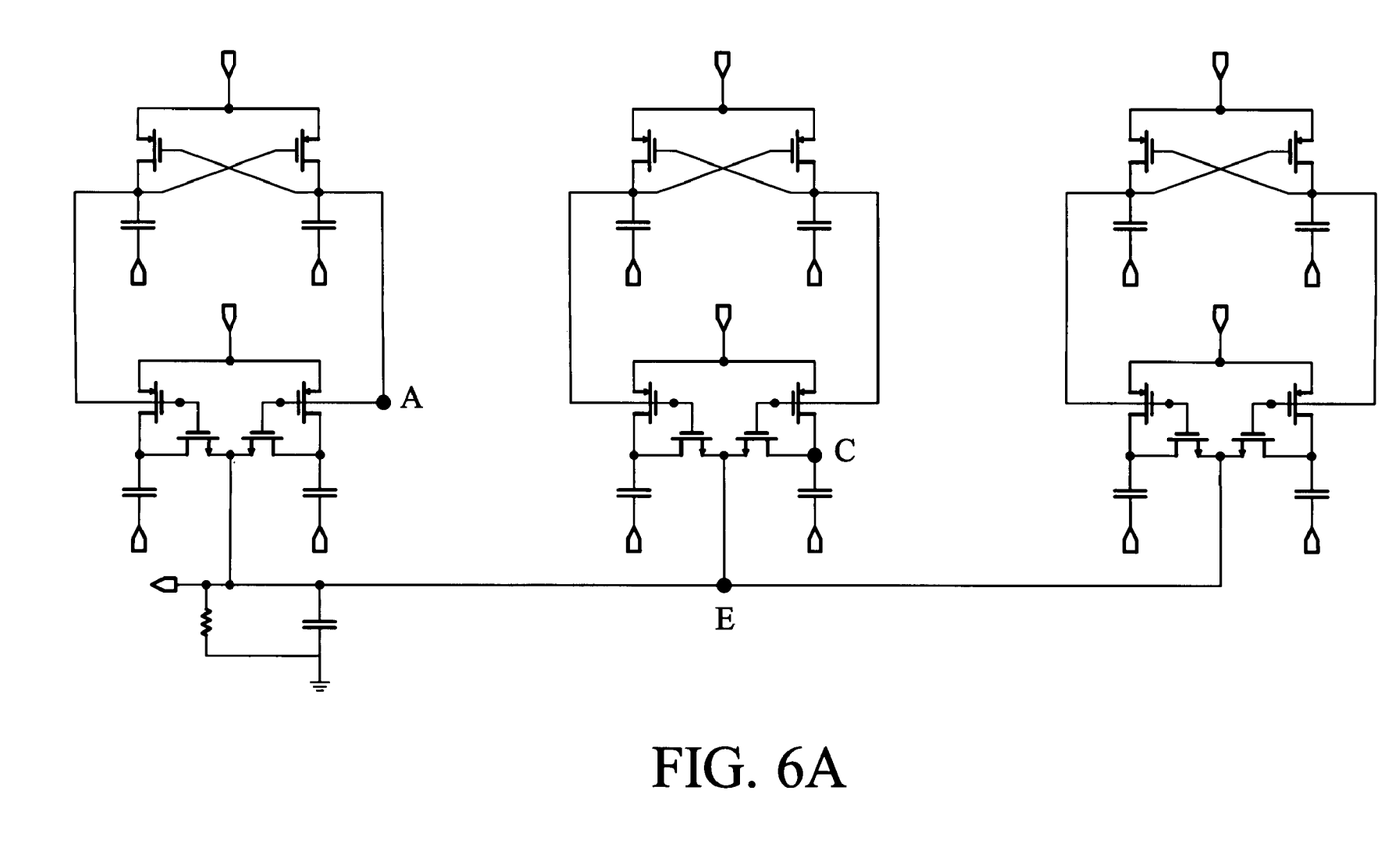
FIGS. 6A and 6B are schematic diagrams of a conventional multi-stage DC-DC converter and a multi-stage converter according to an embodiment of the invention.
Figure 6B:
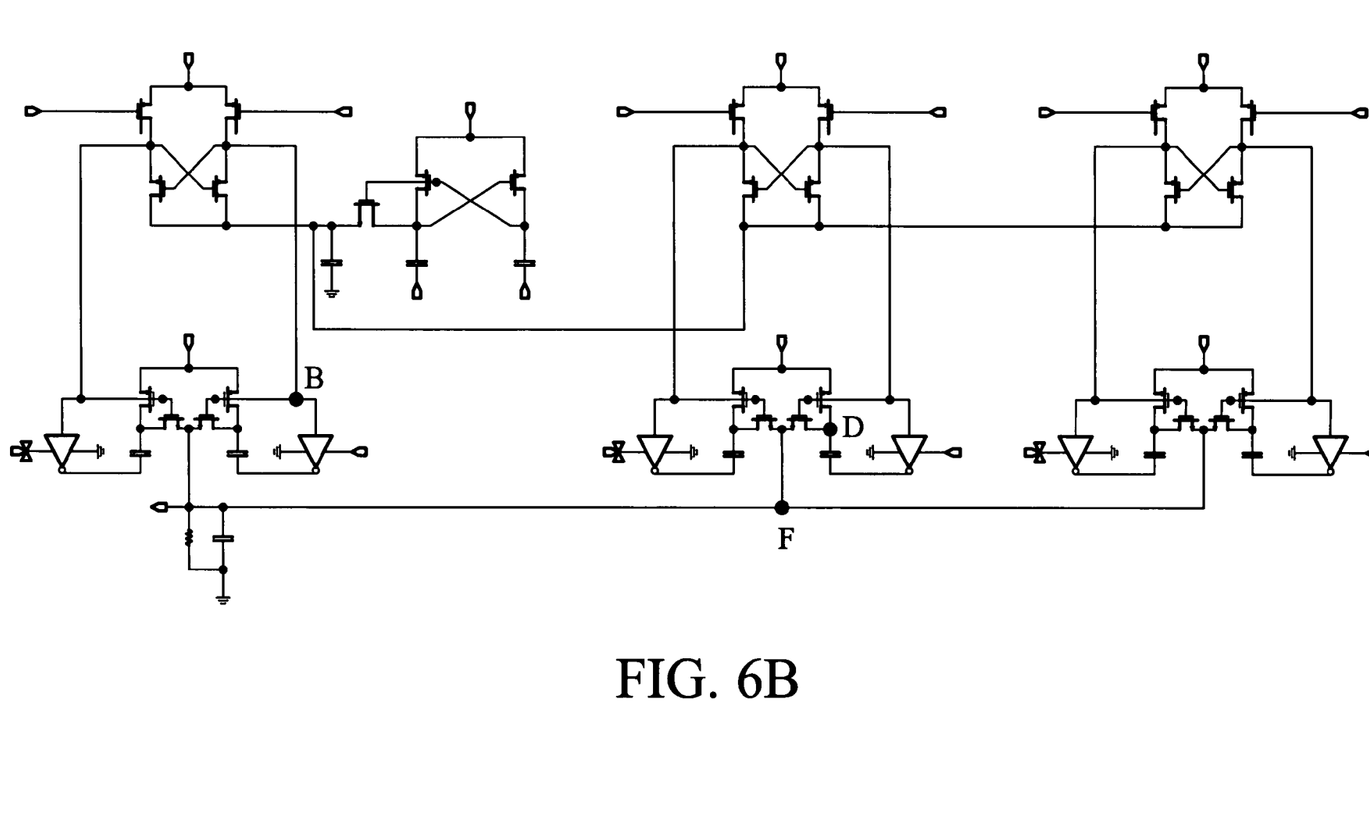

FIGS. 6A and 6B are schematic diagrams of a conventional multi-stage DC-DC converter and a multi-stage converter according to an embodiment of the invention. The advantages of the invention are illustrated by waveform simulations of four points A, B, C, and D therein.

Figure 7A:
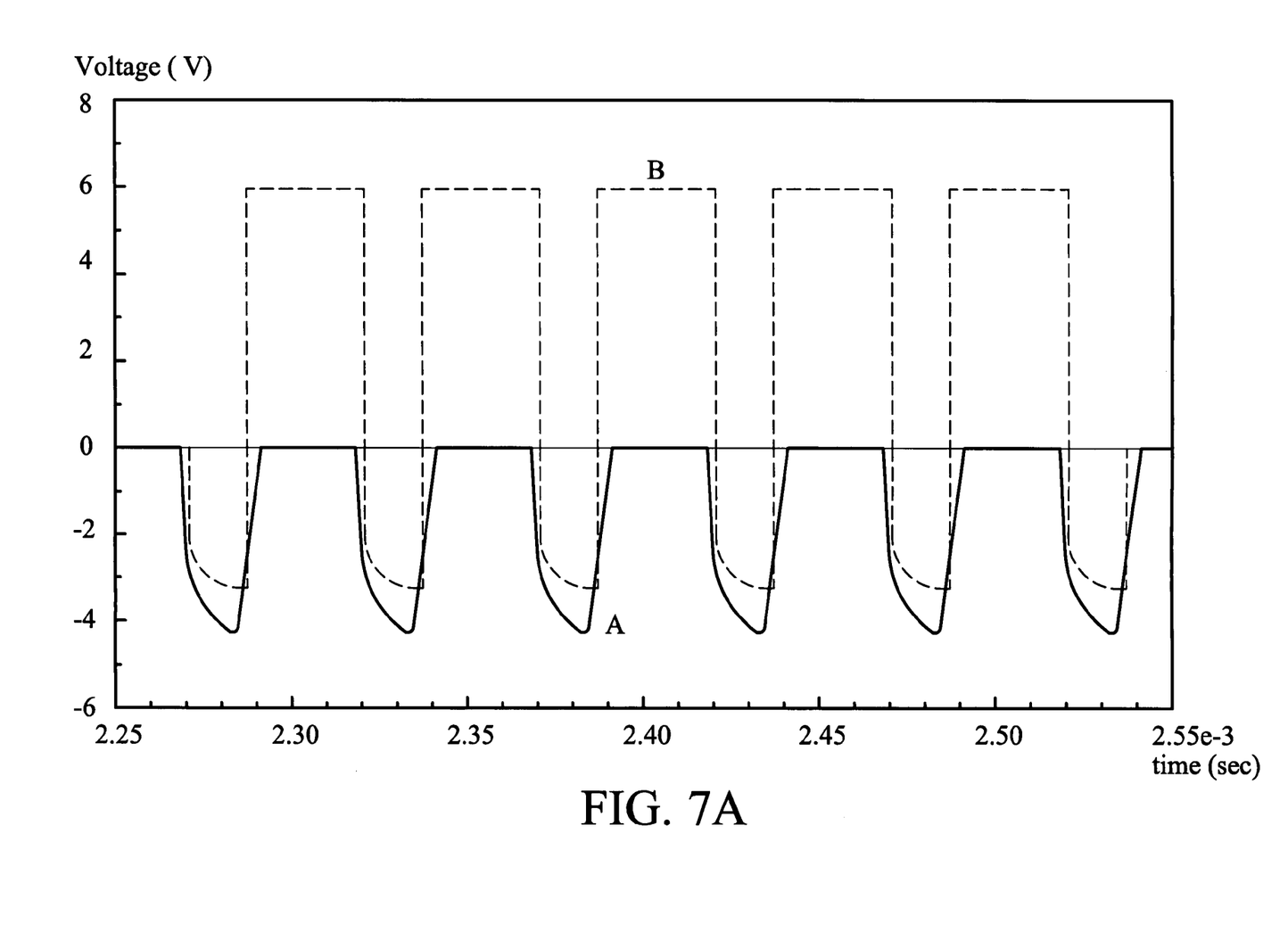
FIG. 7A shows a comparison of signal simulations of point A in FIG. 6A and point B in FIG. 6B.

FIG. 7A shows a comparison of signal simulations of point A in FIG. 6A and point B in FIG. 6B. Signals at points A and B control the switch transistors in the DC-DC sub-converter. As shown in FIG. 7A, the waveform at point B has sharper rising and falling edges than that at point A. In addition, the voltage swing of the signal waveform at point B is larger than that at point A. Performance of the DC-DC converter according to the embodiment of the invention, particularly with respect to switch transistor control, is better than the conventional DC-DC converter.

Figure 7B:
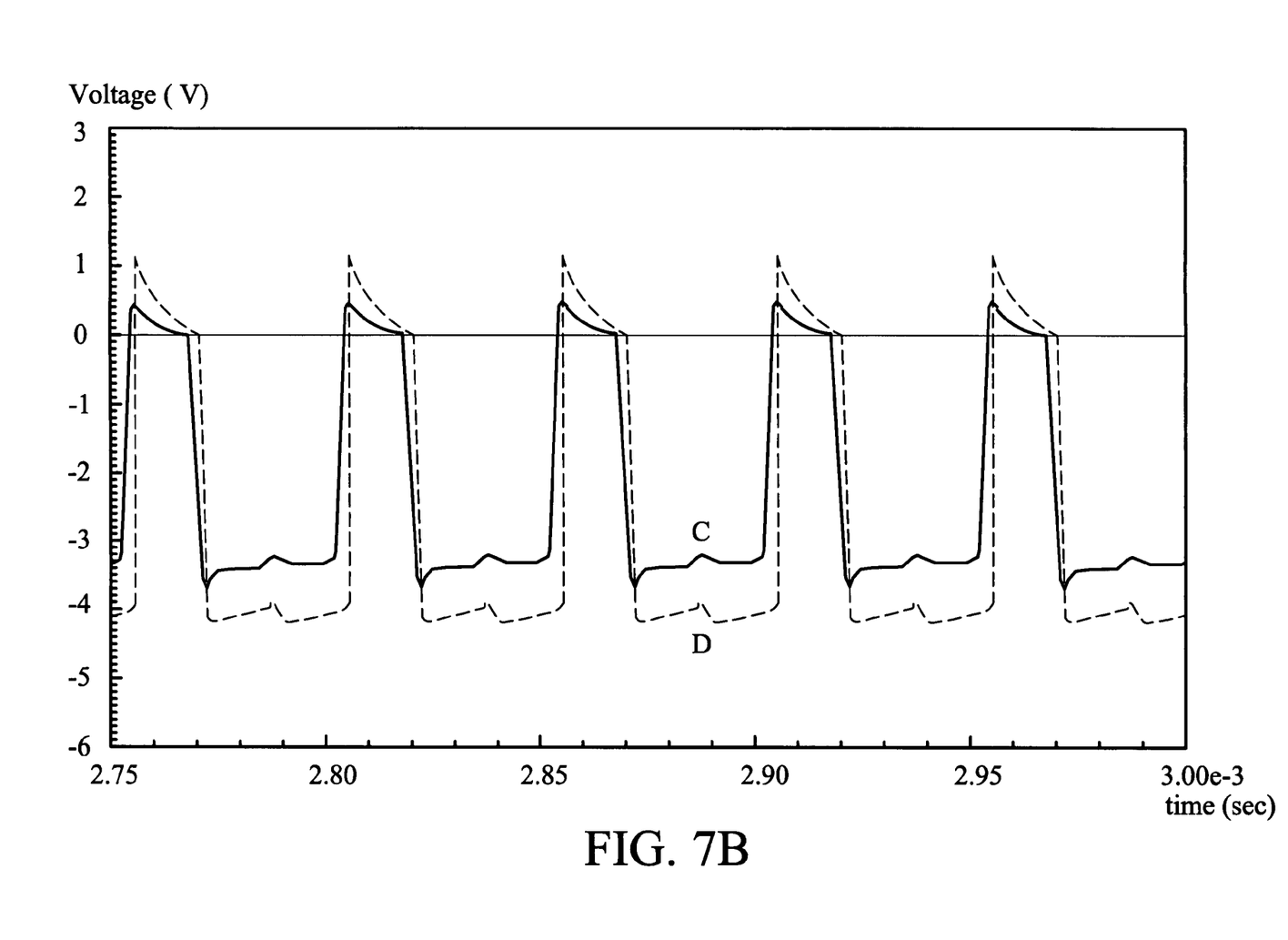
FIG. 7B shows a comparison of signal simulations of point C in FIG. 6A and point D in FIG. 6B.

FIG. 7B shows a comparison of signal simulations of point C in FIG. 6A and point D in FIG. 6B. Signals at points C and D are coupling signals generating a negative voltage to the output loading. These waveforms are as close as possible to the clock signals. As shown in FIG. 7B, the waveform at point D has sharper rising and falling edges than that at point C. In addition, the voltage swing of the signal waveform at point D exceeds that at point C. Performance of the DC-DC converter according to the embodiment of the invention, particularly with respect to charge pumping, improves on the conventional DC-DC converter.

Figure 8:
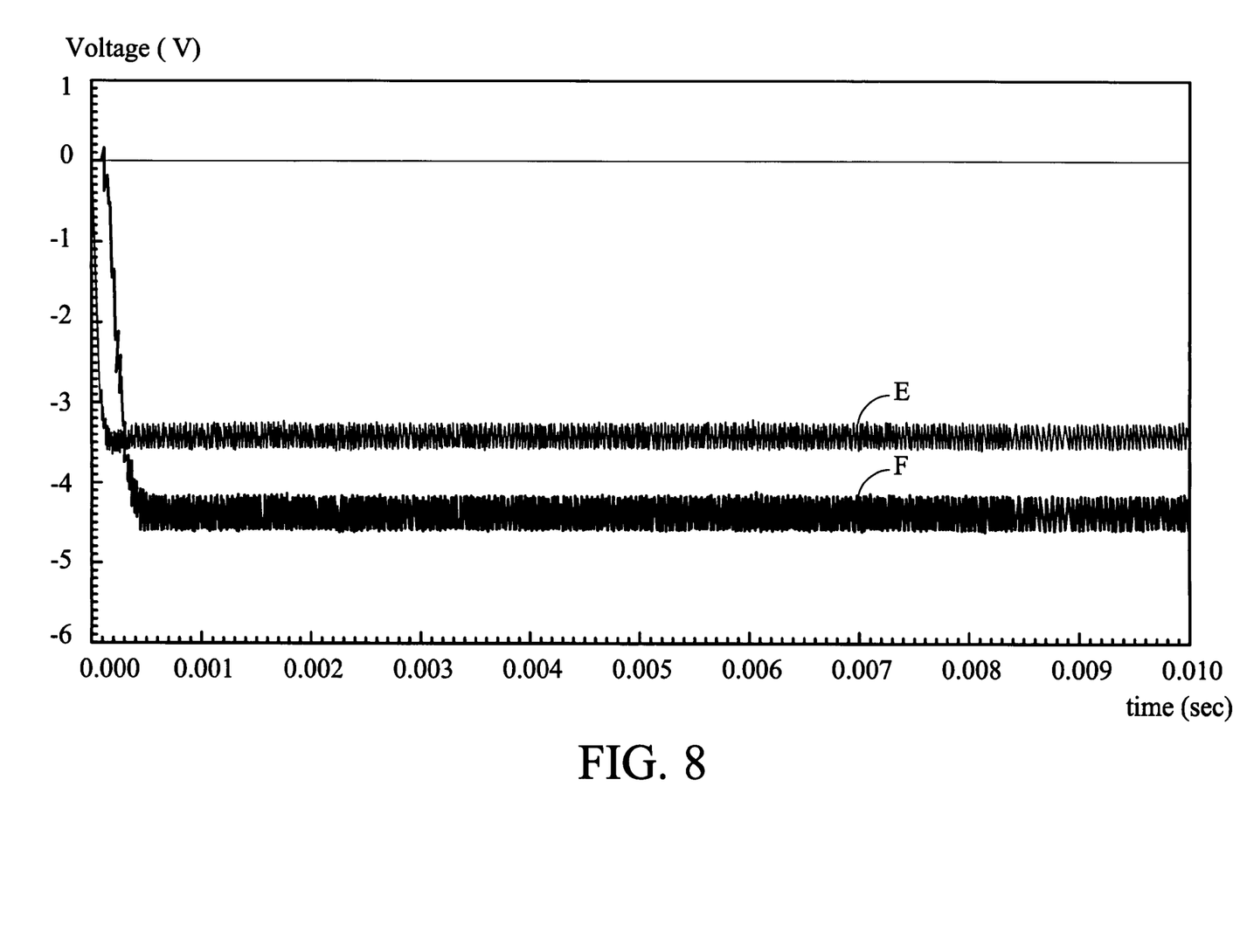
FIG. 8 shows the output waveforms of a DC-DC converter according to an embodiment of the invention and a conventional DC-DC converter.

FIG. 8 compares output waveforms of a DC-DC converter according to an embodiment of the invention and a conventional DC-DC converter. Curve E is the output waveform of the conventional DC-DC converter. Curve F is the output waveform of the DC-DC converter according to the embodiment of the invention. As is shown, the output waveform of curve F is closer to an ideal value than that of curve E. In other words, the DC-DC converter according to the embodiment of the invention provides improved performance over the conventional DC-DC converter.

The DC-DC converter provided by embodiments of the invention utilizes a built-in level shifter and a negative voltage generator to reduce rising and falling times of the clock signal. The voltage swing of the control signals of the switch transistors is increased through the built-in level shifter, such that rising and falling times of the control signals are reduced. In addition, the driving requirements for integrated circuits providing the clock signal are relaxed by the DC-DC converter of the invention.

While the invention has been described by way of example and in terms of preferred embodiment, it is to be understood that the invention is not limited thereto. To the contrary, it is intended to cover various modifications and the advantages would be apparent to those skilled in the art. Therefore, the scope of the appended claims should be accorded the broadest interpretation so as to encompass all such modifications.

What is claimed is:

1. A DC-DC converter in a display panel, comprising:
a negative voltage generator generating a negative voltage;
a level shifter coupled to the negative voltage generator, receiving the negative voltage and generating a pair of complementary switch control signals; and
a DC-DC sub-converter, coupled to the level shifter, controlling a pair of thin film switch transistors controlled by the complementary switch control signals, wherein the DC-DC sub-converter has a charge pump type structure, and comprises:
a pair of inverters respectively receiving the complementary switch control signals; and
a pair of coupling capacitors, each having an end connected to an output of one of the inverters and an other end connected to one of the thin film switch transistors.

2. The DC-DC converter as claimed in claim 1, wherein the inverters and the level shifter are coupled to a DC supply voltage.

3. The DC-DC converter as claimed in claim 1, wherein the thin film switch transistors are controlled by signals output from the inverters.

4. The DC-DC converter as claimed in claim 1, wherein the negative voltage generator has a charge pump type structure.

5. The DC-DC converter as claimed in claim 3, wherein the negative voltage generator comprises a pair of cross-coupled transistors and a pair of coupling capacitors.

6. The DC-DC converter as claimed in claim 1, wherein the level shifter comprises a pair of cross-coupled transistors.

7. A display panel comprising the DC-DC converter as claimed in claim 1.

8. A DC-DC converter in a display panel, comprising:
a negative voltage generator generating a negative voltage;
a level shifter coupled to the negative voltage generator, receiving the negative voltage and generating a pair of complementary switch control signals; and
a DC-DC sub-converter coupled to the level shifter, comprising:
a pair of inverters receiving the complementary switch signals;
a pair of thin film switch transistors controlled by the complementary switch signals and output signals of the inverters; and
a pair of coupling capacitors, each having an end connected to an output of one of the inverters and an other end connected to one of the thin film switch transistors.

9. The DC-DC converter as claimed in claim 8, wherein the inverters are respectively coupled to a DC supply voltage.

10. The DC-DC converter as claimed in claim 8, wherein the negative voltage generator has a charge pump type structure.

11. The DC-DC converter as claimed in claim 10, wherein the negative voltage generator comprises a pair of cross-coupled transistors and a pair of coupling capacitors.

12. The DC-DC converter as claimed in claim 8, wherein the level shifter comprises a pair of cross-coupled transistors.

13. A DC-DC converter in a display panel, comprising:
a negative voltage generator generating a negative voltage and comprising a pair of transistors, each comprising a drain to receive a first control signal;
a level shifter coupled to the negative voltage generator, receiving the negative voltage and generating a pair of complementary switch control signals;
a DC-DC sub-converter, coupled to the level shifter, controlling a pair of thin film switch transistors controlled by the complementary switch control signals, wherein the DC-DC sub-converter has a charge pump type structure and comprises:
a pair of inverters respectively receiving the complementary switch control signals; and
a pair of coupling capacitors, each having an end connected to an output of one of the inverters and an other end connected to one of the thin film switch transistors.

14. The DC-DC converter as claimed in claim 13, wherein the inverters and the level shifter are coupled to a DC supply voltage.

15. The DC-DC converter as claimed in claim 13, wherein the thin film switch transistors are controlled by signals output from the inverters.

16. The DC-DC converter as claimed in claim 13, wherein the negative voltage generator has a charge pump type structure and the level shifter comprises a pair of cross-coupled transistors.

* * * * *